June 25, 1946.　　D. A. BAIRD ET AL　　2,402,527
CLUTCH
Filed April 24, 1944　　3 Sheets-Sheet 3
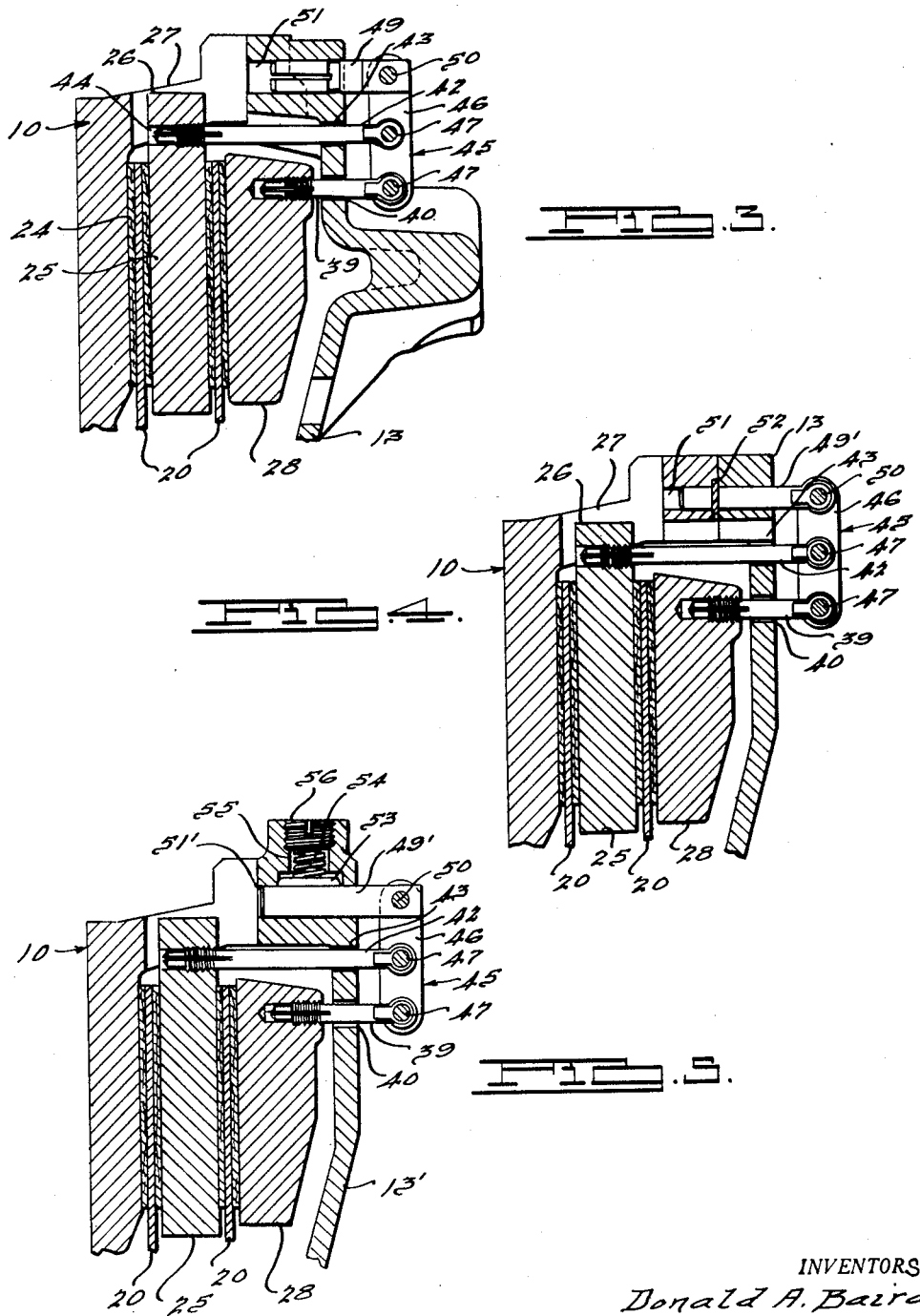
INVENTORS.
Donald A. Baird.
AND Jay C. Auten
By Harness & Harris
ATTORNEYS.

Patented June 25, 1946

2,402,527

UNITED STATES PATENT OFFICE 2,402,527

CLUTCH

Donald A. Baird, Detroit, and Jay C. Auten, Royal Oak, Mich., assignors to Chrysler Corporation, Highland Park, Mich., a corporation of Delaware Application April 24, 1944, Serial No. 532,416

11 Claims. (Cl. 192—69)

This invention relates to clutches and more particularly to multiple disc clutches of the friction type.

An object of the invention is to insure relative separation of the clutch components to thereby effectively release the drive therebetween. More particularly the invention provides for movement of certain of the components in a predetermined relation incident to release of the drive, and automatic adjustment to maintain the predetermined relation substantially constant regardless of wear.

Another object of the invention is to insure the aforesaid relation of the components regardless of the extent of travel of the mechanism to effect release of the clutch and to provide in conjunction therewith the aforesaid automatic adjustment.

Other objects of the invention will be more apparent from the following description taken in connection with the accompanying drawings, wherein:

Fig. 3 is a fragmentary view, mainly in section, taken on line 3—3 of Fig. 1.

Figs. 4 and 5 are views generally similar to Fig. 3, but illustrating further embodiments of the invention.

Figure 1:
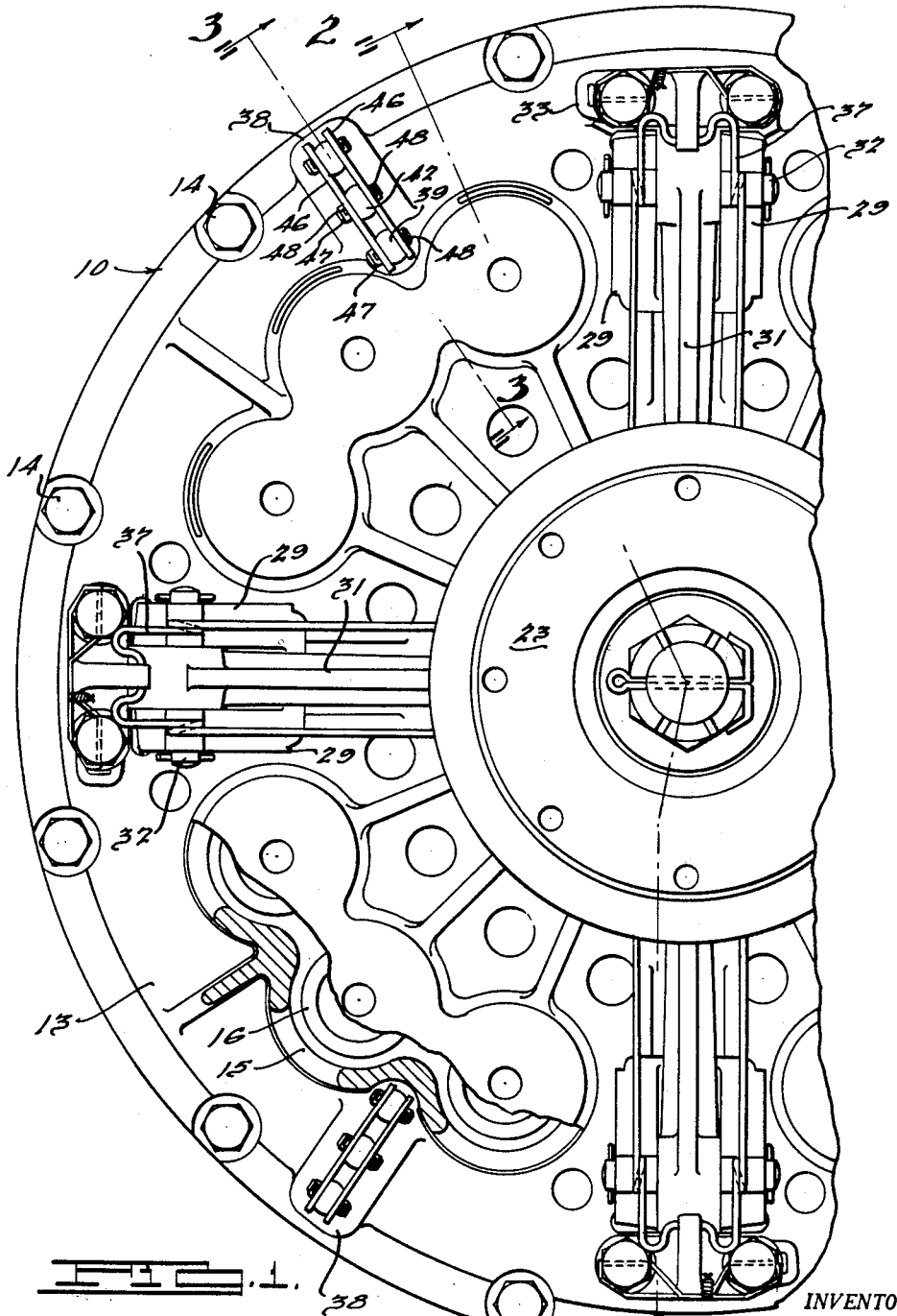
Fig. 1 is a fragmentary end elevational view of a clutch embodying the invention.

Referring to the drawings, the numeral 10 designates an engine flywheel of the so-called "pot" type which is carried by a hub 11 having splines 12 for connection with an engine crankshaft, not shown. The flywheel 10 includes a cover 13 secured at circumferentially spaced locations to the main body of the flywheel by cap screws 14 and having a plurality of pockets 15 carrying coil springs 16 which urge the clutch plates or discs together as hereinafter set forth.

The driven portion of the clutch includes a hollow hub 17 journalled in the hub 11 by a bearing unit 18 and having an annular toothed portion 19 receiving the teeth of a pair of annular driven discs 20. The hub 17 is journalled in a sleeve-like portion 21 of the cover 13 by a bearing unit 22 and has drivingly connected therewith a coupling member 23.

The driving part of the clutch includes the flywheel 10, the inner face 24 of which is engaged by the adjacent driven disc 20, and an annular ring-shaped disc 25 intermediate the driven discs 20 and having a plurality of circumferentially spaced lugs, one of which is shown at 26 in Fig. 3, respectively projecting into radially extending recesses, one of which is shown at 27 in Fig. 3, in the flywheel 10 forming a driving connection between the latter and the disc 25. The discs 20 and 25 are urged axially to the left, as viewed in the various figures, to effect drive transmitting engagement by the springs 16 acting on a pressure ring 28 which is driven with the driving part of the clutch. The pressure ring 28 has a plurality of axially extending circumferentially spaced pairs of lugs 29 respectively projecting through a registering opening in the cover 13, one such opening being shown at 30 in Fig. 2.

Figure 2:
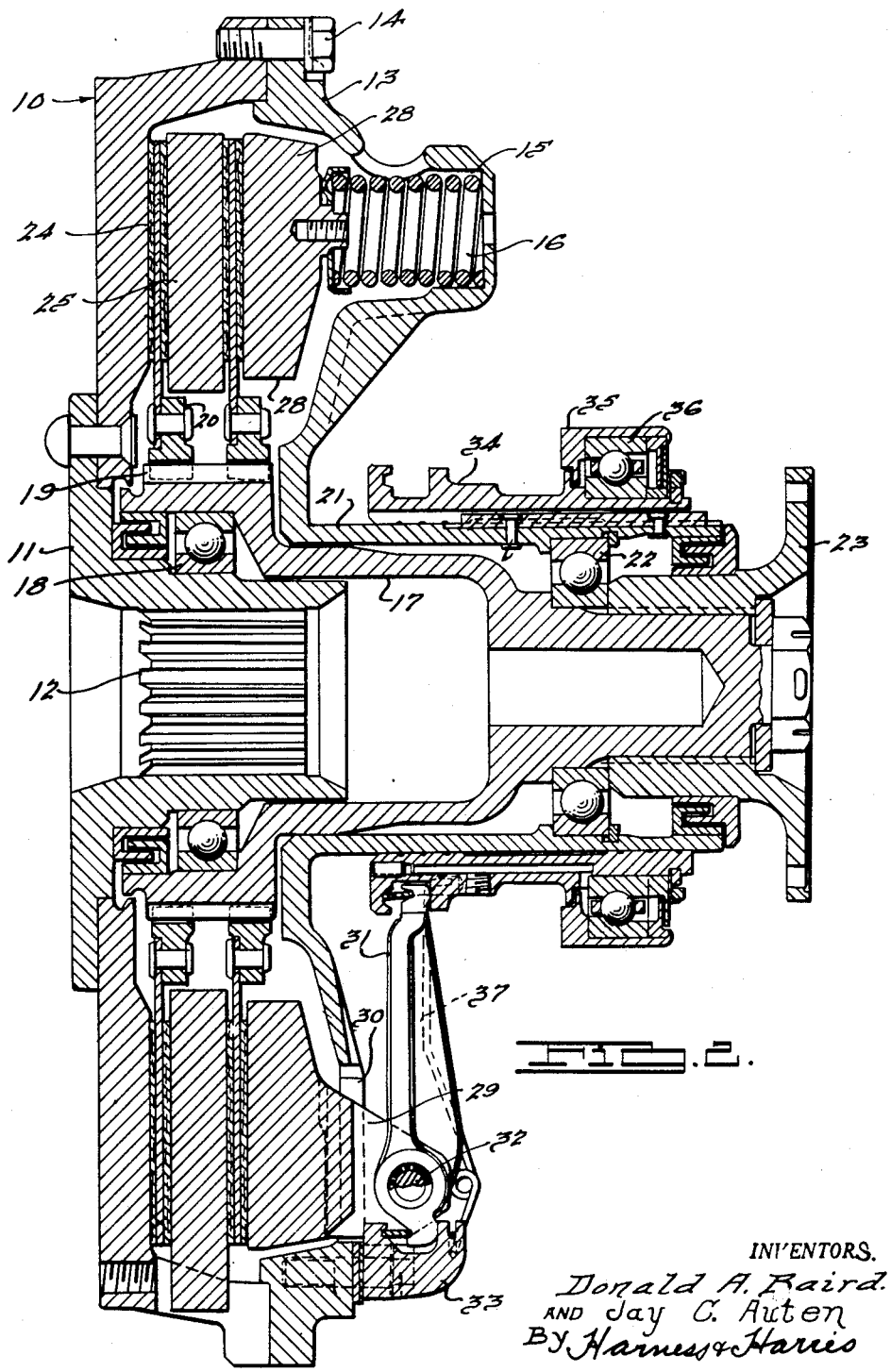
Fig. 2 is a longitudinal sectional view taken on the line 2—2 of Fig. 1.

The clutch release mechanism includes a plurality of circumferentially spaced radially extending levers 31 respectively attached to a pair of adjacent lugs 29 by a pin 32 and journalled relative to the latter as shown more particularly in Fig. 2. Each lever 31 includes a relatively short arm, as shown in Fig. 2, which is engaged with a lug 33 carried by the cover 13 and a relatively long arm having the end portion thereof received in an annular channel of a release sleeve 34 surrounding and keyed to the cover part 21 for axial movement relatively thereto by any suitable means, not shown, and engageable with a collar 35 fixed against axial movement relative to the sleeve 34 and journalled with respect thereto by the bearing unit 36. A spring 37 acting between each lug 33 and the sleeve 34 and engaged with the adjacent lever 31 acts as a dampener.

In operation the pressure exerted by the springs 16 on the ring 28 forces the driving and driven parts into drive transmitting engagement, as shown in Fig. 2, and thus driving torque is transmitted from the flywheel 10 to the hub 17. To release the drive transmitting engagement the release sleeve 34 is moved to the right, as viewed in Fig. 2, to swing the levers in a clockwise direction and, with the short arm of each lever acting on its adjacent fixed lug 33, to shift the pressure ring 28 to the right against the resistance of the springs 16. Upon release of the force acting to shift the sleeve as aforesaid, the parts will be returned to their Fig. 2 position under the influence of the springs 16.

In order to insure movement of the intermediate driving disc 25 to release the drive when the pressure ring 28 is shifted to the right by the release mechanism as aforesaid, the disc 25 is operatively connected with the pressure ring 28 at circumferentially spaced locations indicated by the numeral 38. A typical connection is shown more particularly in Fig. 3 and includes a rod 39 extending through an opening 40 in the cover 13 and having a split end portion threaded into an opening in the ring 28. A rod 42 extends through an opening 43 in the cover 13 and has a split end portion threaded into an opening 44 in the adjacent lug 26 of the intermediate driving disc 25. The ends of the rods 39 and 42 exterior of the casing are connected to an arm 45.

As shown in Fig. 1, each arm 45 includes a pair of plates 46 laterally spaced to receive therebetween the eyed ends of the rods 39, 42 and respectively pivotally connected with the latter by a pin 47 and retained in assembled position by cotter pins 48.

A pin 49 has an eyed end disposed between the plates 46 and connected with the arm by a pivot 50 passing through the plates 46 to accommodate swinging of the arm 45 relative to the pin 49 as will more fully be set forth. Each pin 49 extends into a bore 51 in the cover 13 and flywheel 10 and is split axially to provide fingers which frictionally engage the wall of the associated bore 51 to adjustably maintain the pin in the desired relation to the flywheel structure.

Initially, the pressure ring 28 moves, under the influence of the aforesaid release mechanism, a predetermined distance to release the drive between the driving and driven parts of the clutch. The above described connection between the disc 25 and the ring 28 insures movement of the former in a fixed relation with respect to the ring during retraction of the latter. In a typical installation the ring 28 may move in a two to one relation to the disc 25 and thus the respective connections of the rods 39, 42 with the arm 45 are so spaced from the axis of pivot of the latter as to effect this relation.

In assembly, the drive transmitting engagement position of the various components are established prior to connection of the arm 45 with the pin 49, the rods 39, 42 being assembled as shown. The proper position of the arm 45 being thus fixed, the pin 49 is of necessity adjusted to its required position in order that the eye thereof can register with the openings in the plates 46 to receive the pivot 50. In the event of wear of the friction faces of the discs 20 and a resultant increase in movement of the ring 28 in its clutch engaging direction, the pin 49 will be automatically adjusted axially relative to the bore 51 by a force transmitted thereto through the rods 39, 42 and arm 45, such force being that directed against the ring 28 by the springs 16 and being, of course, sufficient to overcome the resistance to this movement created by the frictional engagement of the fingers of the pin 49 with the bore 51.

The Fig. 4 embodiment differs from that of the prior showing in that a snap ring 52 disposed between the adjacent faces of the flywheel 10 and cover 13 frictionally engages the pin 49' to adjustably accommodate positioning of the latter in the manner of the main embodiment.

In the Fig. 5 embodiment the cover 13' has a bore 51' receiving the pin 49' and the aforesaid frictional resistance to adjustment of the pin 49' is provided by a shoe 53 biased by a spring 54 into engagement with the pin 49'. The shoe 53 and spring 54 are contained in an opening 55 in the cover 13, a plug 56 closing this opening and providing an abutment for the spring 54.

Although but several specific embodiments of the invention have herein been shown and described, it will be understood that various changes in the size, shape and arrangement of parts may be made without departing from the spirit of the invention.

We claim:

1. In a friction clutch including a plurality of driving members and a plurality of driven members arranged alternately with respect to the driving members, a housing for said members, means for releasably urging said members into drive-transmitting engagement, and means for moving one of said driving members in a predetermined relation with respect to another of said driving members incident to release of said driving engagement, said last means including a plurality of rods respectively connected with said one driving member and said another driving member, an arm connected at longitudinally spaced locations thereof with said rods, and a pin pivotally connected with said arm and secured to said housing for adjustment relative thereto under the influence of said release means to shift said arm in a direction transverse to the axis of said pivotal connection.

2. In a friction clutch including a plurality of driving members and a plurality of driven members arranged alternately with respect to the driving members, a housing for said members, means for releasably urging said members into drive-transmitting engagement, and means for moving one of said driving members in a predetermined relation with respect to another of said driving members incident to release of said driving engagement, said last means including a plurality of rods respectively connected with said one driving member and said another driving member, an arm connected at longitudinally spaced locations thereof with said rods, and a pin supporting said arm for pivotal movement as an incident to release of said drive-transmitting engagement and so secured to said housing as to be adjustably positioned relative thereto by the thrust of the first mentioned means to establish said drive-transmitting engagement.

3. In a friction clutch including a plurality of driving members and a plurality of driven members arranged alternately with respect to the driving members, a housing for said members, means for releasably urging said members into drive-transmitting engagement, and means for moving one of said driving members in a predetermined relation with respect to another of said driving members incident to release of said driving engagement, said last means including a plurality of rods respectively connected with said one driving member and said another driving member, an arm connected at longitudinally spaced locations thereof with said rods, and a support for said arm accommodating pivotal movement of the latter incident to release of said drive-transmitting engagement and so connected with said housing as to be moved relative thereto under the influence of the first mentioned means to thereby set the pivotal axis of said arm in accordance with the drive-transmitting position of at least one of the connected driving members.

4. In a friction clutch including interleaved driving and driven parts, means for moving said parts into and out of drive-transmitting engagement including a member swingable about an axis as an incident to release of said drive-transmitting engagement and so connected with a plurality of said parts as to move the same in a predetermined relation in response to said swinging movement, and means supporting said member for said swinging movement and accommodating shift of the same under the influence of the first mentioned means in establishing said drive-transmitting engagement to thereby adjustably set said axis in accordance with the drive-transmitting position of one of said plurality of parts.

5. In a friction clutch including interleaved driving and driven parts, a housing for said parts, means for moving said parts into drive-transmitting engagement and accommodating release of said engagement, means including a member swingable about an axis as an incident to release of said drive-transmitting engagement and so connected with a plurality of driving parts as to move the same in a predetermined relation in response to said swinging movement, and means supporting said member from said housing for swinging thereof and accommodating shift of said member transverse to the axis of pivotal movement whereby said axis is adjustably shifted relative to said housing under the influence of the first mentioned means in response to variation in movement of one of said connected parts to effect said drive-transmitting engagement.

6. In a friction clutch including a plurality of driven parts and a driving part therebetween, a pressure ring, means for moving said ring in a first direction to dispose said parts in drive-transmitting engagement and in a second direction to release said engagement, means for moving said driving part in a predetermined relation with said ring during movement of the latter in said second direction including an arm, a first rod connected with said driving part and said arm, a second rod connected with said ring and said arm, and means supporting said arm for swinging movement in response to movement of said ring in said second direction, the connection of said first rod with said arm being radially intermediate the axis of swing of said arm and the connection of said second rod with the latter.

7. In a friction clutch including a plurality of driven parts and a driving part therebetween, a pressure ring, a housing, means for moving said ring in a first direction to dispose said parts in drive-transmitting engagement and in a second direction to release said engagement, means for moving said driving part in a predetermined relation with said ring during movement of the latter in said second direction including an arm, a first rod connected with said driving part and said arm, a second rod connected with said ring and said arm, and a pin carried by said housing supporting said arm for swinging movement in response to movement of said ring in said second direction, the connection of said first rod with said arm being radially intermediate the axis of swing of said arm and the connection of said second rod with the latter, said pin being so connected with said housing as to be shifted in the direction of its longitudinal axis relative thereto under the influence of the first mentioned means to thereby automatically shift said axis as the extent of movement of said ring in said first direction varies incident to wear of said parts.

8. In a friction clutch including a plurality of driven parts and a driving part therebetween, a pressure ring, a housing, means for moving said ring in a first direction to dispose said parts in drive-transmitting engagement and in a second direction to release said engagement, means for moving said driving part in a predetermined relation with said ring during movement of the latter in said second direction including an arm, a first rod connected with said driving part and said arm, a second rod connected with said ring and said arm, and a pin supporting said arm for swinging movement in response to movement of said ring in said second direction, the connection of said first rod with said arm being radially intermediate the axis of swing of said arm and the connection of said second rod with the latter, said housing having a bore and said pin extending into said bore and frictionally retained therein for adjustment in a direction of its longitudinal axis under the influence of the first mentioned means to thereby automatically shift said axis as the extent of movement of said ring in said first direction varies incident to wear of said parts.

9. In a friction clutch including interleaved driving and driven parts, actuating means for moving said parts into drive-transmitting engagement and accommodating release thereof from said engagement, means for moving a plurality of said parts in a predetermined relation when the same are released as aforesaid including a member operably connected with said plurality of parts and having a first position when said parts are in drive-transmitting engagement and being movable therefrom to a second position as an incident to release of said plurality of parts from drive-transmitting engagement, and mounting means for said member accommodating movement thereof between said positions, and said mounting means being adjustable under the influence of said actuating means in effecting said drive transmitting engagement to thereby adjustably establish the said first position of said member in response to variation in the extent of movement of at least one of said plurality of parts in establishing said drive transmitting engagement.

10. In a friction clutch including interleaved driving and driven parts, actuating means for moving said parts into drive-transmitting engagement and accommodating release thereof from said engagement, means for moving a plurality of said parts in a predetermined relation when the same are released as aforesaid including a member operably connected with said plurality of parts and having a first position when said parts are in drive-transmitting engagement and being movable therefrom to a second position as an incident to release of said plurality of parts from drive-transmitting engagement, and a mounting for said member accommodating movement thereof between said positions frictionally retained in position to establish said member in its said first position, said mounting being adjustably shiftable under the influence of said actuating means in moving said parts into drive-transmitting engagement to thereby vary the said first position of said member as the extent of movement of at least one of said plurality of parts varies in establishing said drive-transmitting engagement.

11. In a friction clutch including a plurality of driving members and a plurality of driven members arranged alternately with respect to the driving members, means for releasably urging said members into drive-transmitting engagement, and means for moving one of said driving members in a predetermined relation with respect to another of said driving members incident to release of said driving engagement, said last means including a plurality of rods respectively connected with said one driving member and said another driving member, an arm connected at longitudinally spaced locations thereof with said rods, and a mounting for said arm accommodating pivotal movement thereof about an axis as an incident to release of said drive-transmitting engagement and shiftable by the thrust of the first mentioned means to thereby adjustably position said axis of pivot as an incident to variation in the extent of movement of a driving member to establish said drive-transmitting engagement.

DONALD A. BAIRD.
JAY C. AUTEN.